(12) United States Patent
Rutz

(10) Patent No.: US 6,425,172 B1
(45) Date of Patent: Jul. 30, 2002

(54) HOMOGENIZING PROCESS FOR FIBER-WRAPPED STRUCTURAL COMPOSITES

(75) Inventor: Rene Rutz, Calgary (CA)

(73) Assignee: Dynetek Industries Ltd., Calgary Alberta (CA)

(*) Notice: Subject to any disclaimer, the term of this patent is extended or adjusted under 35 U.S.C. 154(b) by 0 days.

(21) Appl. No.: 09/628,025

(22) Filed: Jul. 28, 2000

Related U.S. Application Data

(63) Continuation-in-part of application No. 09/556,976, filed on Apr. 24, 2000, now abandoned.

(30) Foreign Application Priority Data

Apr. 23, 1999 (CA) ............................................. 2269976

(51) Int. Cl.⁷ ................................................. B01J 19/00
(52) U.S. Cl. ....................... 29/421.1; 29/446; 29/469.5; 156/172; 156/162; 220/590
(58) Field of Search ............................. 29/419.1, 421.1, 29/446, 447, 452, 458, 469.5, 527.2, 897, 405; 156/160, 161, 162, 172, 285, 287; 264/229, 231, 235, 235.6, 346; 220/581, 588, 584, 590

(56) References Cited

U.S. PATENT DOCUMENTS

| | | | |
|---|---|---|---|
| 2,932,078 A | * 4/1960 | Wilson | 156/161 |
| 3,240,644 A | * 3/1966 | Wolff | 156/165 |
| 3,270,111 A | 8/1966 | Haldemann | |
| 3,960,629 A | 6/1976 | Goldsworthy | |
| 3,969,812 A | * 7/1976 | Beck | 29/446 |
| 4,168,194 A | 9/1979 | Stiles | |
| 4,549,920 A | * 10/1985 | Cogswell et al. | 156/181 |
| 4,622,086 A | 11/1986 | Puck et al. | 156/166 |
| 5,032,201 A | * 7/1991 | Crapiz | 156/172 |
| 5,256,230 A | 10/1993 | Winkel | |
| 5,273,602 A | 12/1993 | Gill | |
| 5,288,357 A | 2/1994 | Yamada et al. | |
| 5,330,595 A | 7/1994 | Held | |
| 5,487,806 A | 1/1996 | Veillard | |
| 5,571,357 A | 11/1996 | Darrieux et al. | |
| 5,822,838 A | * 10/1998 | Seal et al. | 29/469.5 |

* cited by examiner

Primary Examiner—S. Thomas Hughes
Assistant Examiner—Jermie Cozart
(74) Attorney, Agent, or Firm—Millen, White, Zelano & Branigan, P.C.

(57) ABSTRACT

The invention relates to a process for the manufacture of fiber-reinforced pressure vessels and the product produced therefrom. A vessel liner is wrapped with resin-impregnated fibers and cured according to conventional technology. The cured, fiber-wrapped liner is then subjected to a pre-treatment process comprising both elevated temperature and pressure over time. The elevation in temperature allows the resin to soften. The increased pressure imparts a tensile load in the fibers. The tensile load causes fibers to stretch and straighten in the resin. After cooling to typical operating temperatures, and when pressurized for duty, the now straightened fibers are capable of responding immediately to the tensile load and the burst strength of the vessel is increased as a result. The process can be combined with autofrettage in series or simultaneously to achieve even greater final strength.

22 Claims, 7 Drawing Sheets

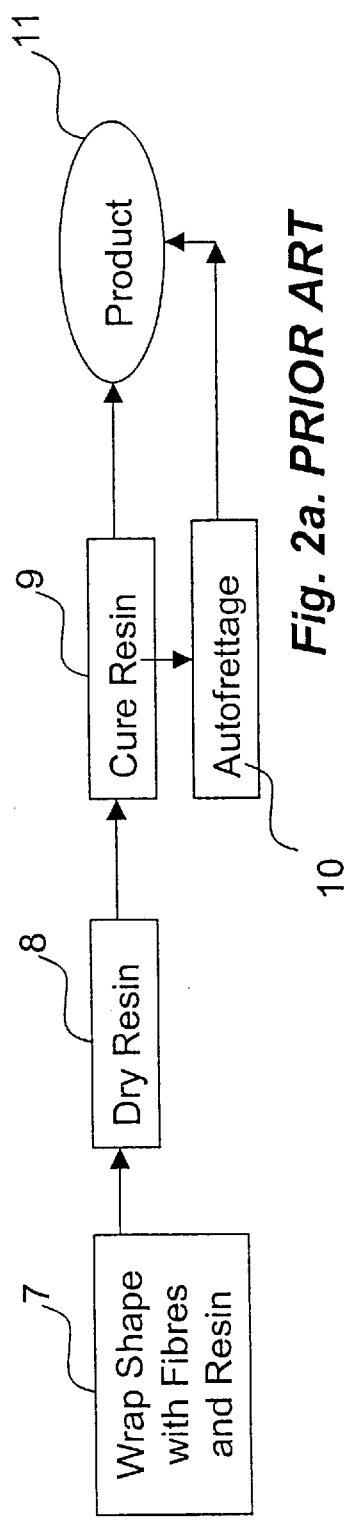
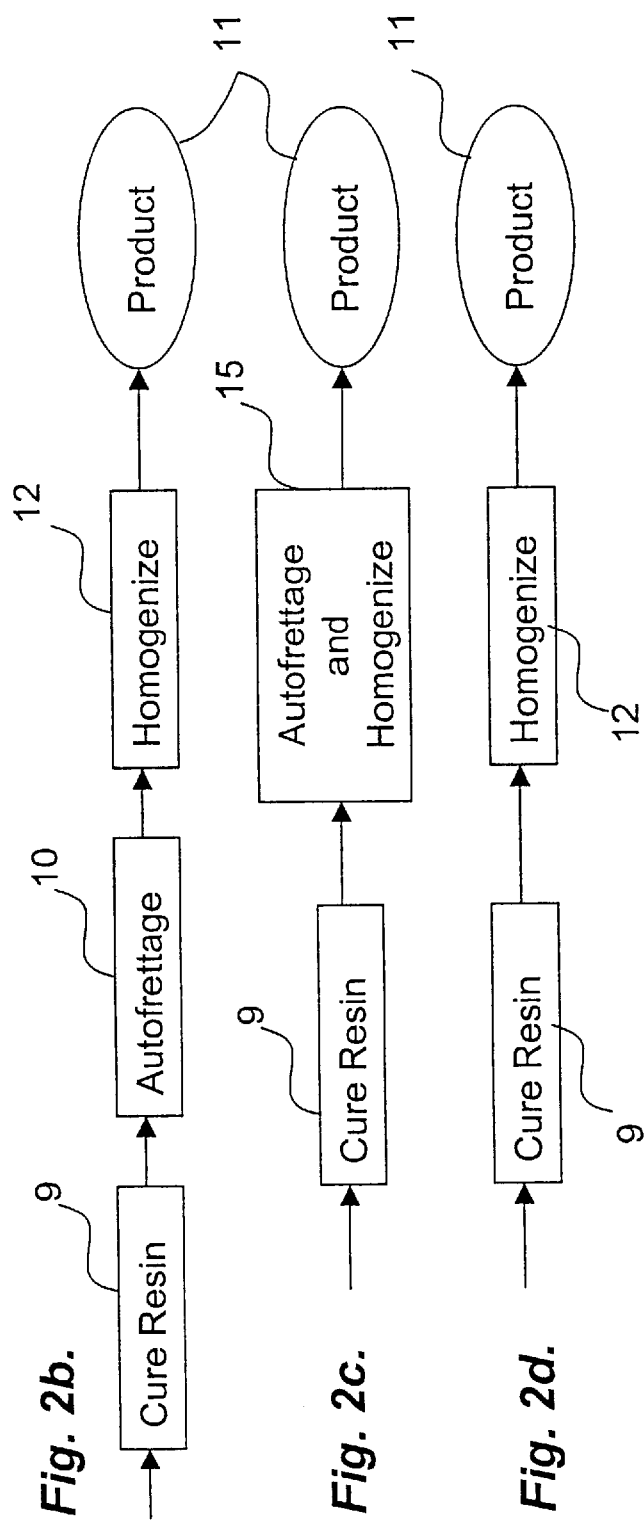
Fig. 2a. PRIOR ART
Fig. 2b.
Fig. 2c.
Fig. 2d.

HOMOGENIZING PROCESS FOR FIBER-WRAPPED STRUCTURAL COMPOSITES

CROSS-REFERENCE TO RELATED APPLICATION

This application is a continuation-in-part of the U.S. application Ser. No. 09/556,976, filed Apr. 24, 2000 now abandoned, and claiming priority of Canadian application serial no. 2,269,976 filed Apr. 23, 1999.

FIELD OF THE INVENTION

Process for the manufacture of resin-impregnated fiber reinforced structural composites and the product resulting therefrom. More particularly, fiber-wrapped pressure vessels are subjected to pressure and temperature pre-treatment to increase their strength.

BACKGROUND OF THE INVENTION

It is known to wrap a variety of underlying shapes with fiber so as to form fiber-reinforced plastic composite products, or FRP. The fiber acts as the structural portion wrapped over a normally weak shape. The fibers act in tension when the composite is stressed. One such example is the manufacture of fiber-reinforced pressure vessels by wrapping hollow, substantially non-structural, liners with fibers.

The conventional processes for making fiber-wrapped composites result in composite products which are not as strong under load as they could be.

Conventionally, fibers are so small that they are usually massed into larger groupings before use in making FRP. Typically a multiplicity of fibers, such as upwards of 12000 fibers, are spooled into tows. Multiple tows are passed through heated resin baths containing catalyzed resins prior to being mechanically wrapped onto a liner. The configuration of the winding is dependant upon the speed of rotation of the vessel liner and the rate of travel of the tow-dispensing apparatus. The most common configurations are helical, in which the tows are at a significant angle from the axis of the object being wrapped; circumferential, in which the tows are wound hoopwise around the object; and polar, in which the tows are wrapped in the direction of the longitudinal axis of the object.

The resin is permitted to dry and is then cured. Curing relates to the process by which the resin is allowed to achieve its final chemical state and effect its purpose to provide reinforcement to the liner. Curing or chemical poly-condensation, is the formation of polymers from monomers with the release of water or another simple substance. Curing is usually performed at elevated temperatures however, room temperature may be sufficient for some types of resins.

The cured state is typically where the conventional process ends and the resulting product is pressed into service.

The manufacturing processes of the prior art appear unable to wrap the fibers onto a shape in such a way that all fibers are equally prepared to carry a tensile load, such as when restraining a vessel liner under pressure or a beam under bending. It is hypothesized that fibers within the tows are not all arranged in such a way within the resin so as to be capable of immediately carrying tensile load when pulled. More specifically, it is hypothesized that as the fibers are wrapped, bends are introduced and when the liner is pressurized some of the fibers accept tension and others merely straighten without accepting any significant load.

The result of these inequities or disparities between fibers within the wrap is that structural composites of the prior art are not capable of achieving as strong a wrap as is theoretically possible if all of the fibers shared the load.

SUMMARY OF THE INVENTION

The current invention addresses the disparity in tension sharing between fibers as is experienced by the prior art. The solution is achieved by altering the arrangement of the fibers within the resin to effect greater ability to share tensile loads and ultimately increase the strength of the fiber-wrapped shape. This homogenization or equalization of the tensile load between individual fibers is accomplished by causing the fibers to move within the resin in response to load applied to the shape. Under typical operating pressures and temperatures, fibers are substantially immobile within the cured resin. Under the process of the invention, the resin properties are manipulated to permit heightened mobility therein and the fibers are manipulated to permit fibers to achieve a more optimal arrangement.

Generally, a fiber-wrapped shape or liner of a pressure vessel is subjected to elevated temperature and elevated pressure over time. The elevated temperature allows the fibers to become mobile within the resin. The elevated pressure from within the vessel effects a change in the tensile load carried by each of the discrete fibers.

The elevation in temperature of the resin must be sufficient to allow the fibers to be mobile therein and the loading or vessel pressure must be sufficient to stress the fibers and initiate their movement to a new and lower-stress arrangement. Once the resin is cooled to operating temperatures, the multiplicity of fibers share tension load more equally.

In a broad aspect of the invention then, a process for the homogenization of a tension in a plurality of fibers embedded in fiber-reinforced composites comprises the steps of:

raising the temperature of the resin above operating temperatures so as to allow the resin to soften;

manipulating the composite so as to introduce tension into the fibers;

maintaining resin temperature and fiber tension as long as necessary to permit the fibers to move within the resin thereby permitting the tension in the fibers to homogenize; and then cooling the resin and fiber matrix wherein the multiplicity of fibers are better able to share tensile loads imposed thereon.

Preferably the composite is a fiber-wrapped liner or pressure vessel and the means for introducing tension into the fibers involves pressurizing the liner. Ideally the temperature is elevated to a range in which the fibers become mobile within the resin, but the properties of the resin, the fibers or the shape are not permanently degraded. Further, the tensioning of the fibers is performed without causing failure of the shape or the fibers. An example of a vessel benefiting from such a process is a vessel used for store fuel gases such as natural gas and hydrogen.

More preferably, autofrettage is practiced in series with the homogenizing process or simultaneously therewith and thereby achieving even greater resultant strength.

BRIEF DESCRIPTION OF THE DRAWINGS

FIG. 2a is a schematic describing the wrapping, drying and curing process of the prior art which may or may not include autofrettage;

FIG. 2b is a schematic describing the first embodiment wherein autofrettage and homogenizing are performed sequentially after curing;

FIG. 2c is a schematic describing the novel process illustrating the second embodiment of the invention, specifically practicing autofrettage and homogenizing simultaneously after curing;

FIG. 2d is a schematic describing the third embodiment wherein homogenizing is practiced right after curing;

DETAILED DESCRIPTION OF THE PREFERRED EMBODIMENT OF THE INVENTION

Figure 1:
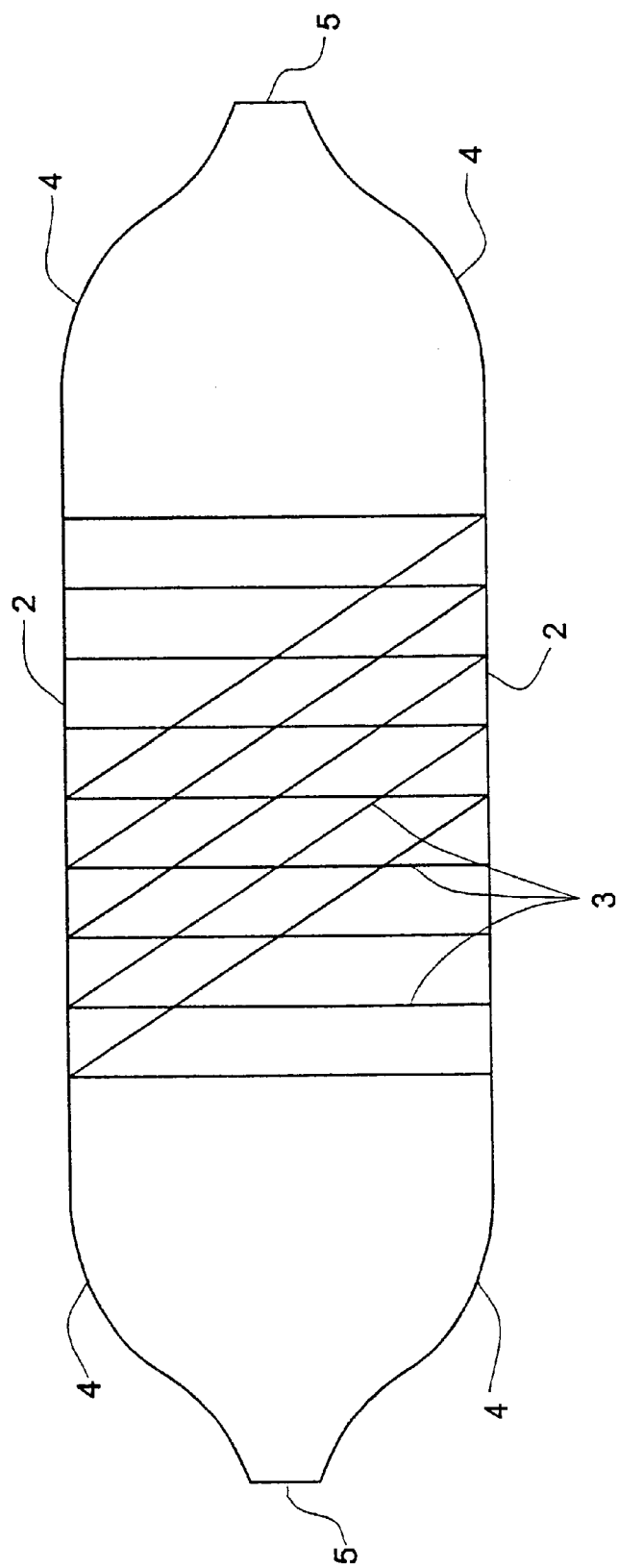
FIG. 1 is a side view of an aluminum liner wrapped helically and circumferentially with resin-impregnated fibers.

Having reference to FIG. 1, a structural composite comprises a fiber-reinforced pressure vessel 1 having a liner 2 which is wrapped with resin impregnated fibers 3. While the invention is described in terms of a pressure vessel liner, it is understood that the process is related to treating tensile bearing fibers overwrapping a shape to form a structural composite, most preferably a vessel liner 1, but also beams and the like.

In the case of a pressure vessel, the liner 2 acts to contain fluid and the fibers 3 act to reinforce the liner 2 and increase it's burst strength.

The liner 2 of the vessel 1 is an aluminum tube having hemispherical ends 4 formed thereon with axially and threaded nozzles 5 longitudinally protruding from the hemispherical ends 4.

The liner 2 is wrapped helically and circumferentially, with resin-impregnated fibers 3 using conventional technology.

The fiber tows 3 typically contain approximately 12000 fibers each. Each of the 10 or 12 tows used simultaneously to wrap the liner 2, are first passed through a heated resin bath to impregnate them with catalyzed resin. The fibers and resin are mechanically wrapped onto the liner 2.

With reference to FIG. 2a, once wrapped, the liner is air dried 8. The fiber-wrapped wrapped liner is then heated 9 in a hot air oven at about 125 degrees Celsius to cure the resin.

The cured, fiber-wrapped liner 9, if constructed of a ductile metal, may be subjected to autofrettage 10. Autofrettage 10 is the process of prestressing the aluminum liner 2 within the wrap increasing the ultimate burst pressure or the load at which its permanent deformation occurs.

In more detail, the autofrettage process 10 comprises placing the cured 9 fiber-wrapped liner 2 inside a protective housing and over-pressurizing the liner 2, causing it to yield. When the pressure is released, the tension in the liner 2 diminishes and then becomes compressive at ambient pressure (pre-stressed). Accordingly, on re-pressurization, the stress on the liner is first progressively reduced from compressive, then passes through zero, then finally becomes tensile. Pressure cycles causing tensile stress are a major factor in precipitating fatigue stress failures. With the initial pre-compressive stress, each pressure cycle results in a lower maximum tensile stress in the liner and thus improves its fatigue strength.

The foregoing constitutes the state of the art for fiber-wrapped liners.

With reference to FIGS. 2b–2d, the invention stated herein involves further treating the fiber-reinforced liner with a novel homogenizing step 12 following the curing process.

Specifically, as shown in FIG. 2b, after curing, in a first embodiment shown in FIG. 2b, the homogenizing step follows autofrettage 10. Autofrettage 10 is optionally performed on the cured vessel for acquiring additional structural gains described above, it not being a requirement of the invention.

In a second embodiment of the invention, shown in FIG. 2c, the homogenizing step 12 comprises following the curing step 9 with a combined autofrettage and homogenizing step 15.

In a third embodiment shown in FIG. 2d, the homogenizing step 12 directly follows the curing step 9.

Figure 8A:
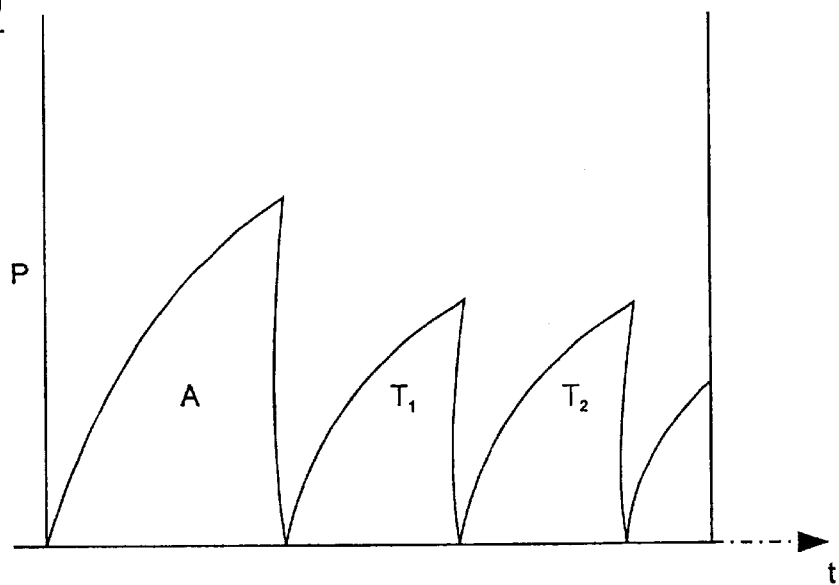
FIG. 8a illustrates a graph of pressure versus time for a pressure vessel treating incorporating autofrettage and the follow-up cyclical testing process.

Typically, as shown in FIG. 8a, a vessel having an aluminum liner is subjected to autofrettage A. This is followed by a testing operation involving repetitive pressure cycle testing T1, T2, T3, and so on, ensuring the fiber-wrapped liner meets accepted performance standards such as those set forth by the Canadian Standards Association.

Figure 8B:
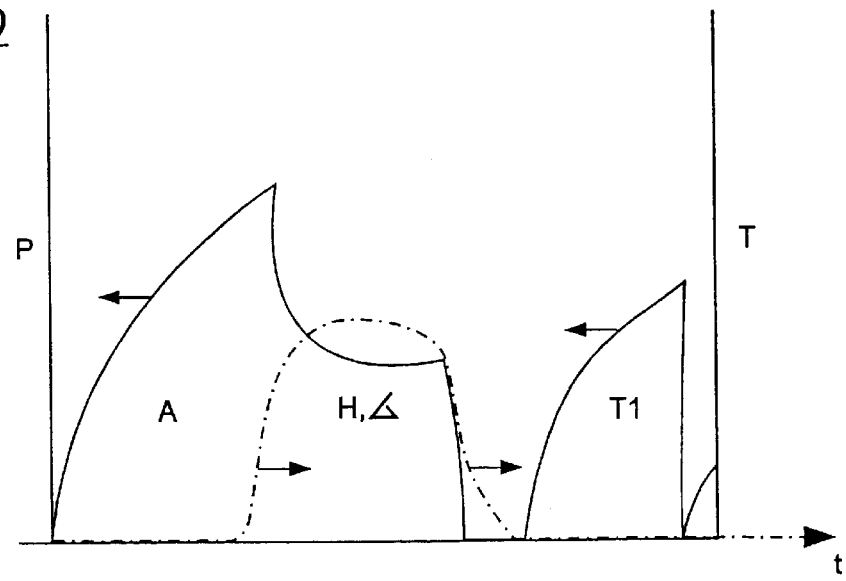
FIG. 8b illustrates a graph of pressure and temperature versus time for treatment of a pressure vessel applying the first embodiment of the invention wherein homogenization follows autofrettage.

Turning to FIG. 8b which illustrates a first embodiment of the invention, the homogenizing step follows autofrettage by first safely re-pressurizing the fiber-wrapped liner with liquid for expanding the liner and applying a tensile load to the fibers. The elevated pressure is maintained at above yield pressure but below burst pressure of the liner and its fiber-wrapping, while simultaneously, the temperature of the fiber-wrapped liner 2 is elevated to allow the cured resin to soften.

The elevation in temperature is accomplished by placing the fiber-wrapped liner 2 inside a chamber capable of having its ambient temperature raised and lowered. The temperature and pressure used are primarily dependant upon the type of liner and resin used.

The resin is softened to permit the fibers to become mobile within the resin. When subjected to tension, fibers, which are not absolutely straight, will generate bending stresses and lateral loads result. Because the fibers are embedded in resin, the lateral loads become imposed on the resin. Vector analysis of the axial and lateral loads on the fibers demonstrates a high resultant load and thus the desired ultimate axial load bearing capability is less as a result.

Softening of the resin, due to elevated temperature, permits the lateral load produced by a tense fiber to displace the resin and thus relax. The fibers, whether the tension is localized due to wavy misalignment or over longer lengths, are permitted to relax laterally and migrate through the resin. Higher tension fibers relax, causing lower tension fibers to start to act and increase their tension, the tension present in all acting fibers generally becoming more homogenized.

For epoxy resin the temperature must be elevated to greater than 60 degrees Celsius to soften the resin but should be maintained at less than 150 degrees Celsius to avoid degradation. The aluminum liner maintains its integrity up to temperatures of approximately 170 degrees Celsius and is therefore not at risk of degradation, should it reach the same temperature as the resin during this process.

Different liquids can be used to safely pressurize the vessel depending upon the temperature.

The applied and elevated temperature is preferably as high as possible without causing degradation of the any component of the composite. It is likely that the resin is at the greatest risk. A table of various resins and their approximate temperature sensitivity is as follows:

TABLE 1

| Resin | Maximum Temp ° C. |
|---|---|
| Polyester | 100 |
| Epoxy | 150 |
| Phenolic Resin | 150 |
| Vinyl esters | 150 |
| Silicones | 1000 |

A table of various fibers and their temperature sensitivity is as follows:

TABLE 2

| Fiber | Type | Maximum Temp ° C. |
|---|---|---|
| Organic | Aramid | 350 |
| Glass | E-Mono | 400 |
|  | S-Mono | 400 |
| Graphite | High Strength | 500 |
|  | Low Strength | 500 |

Figure 3A:
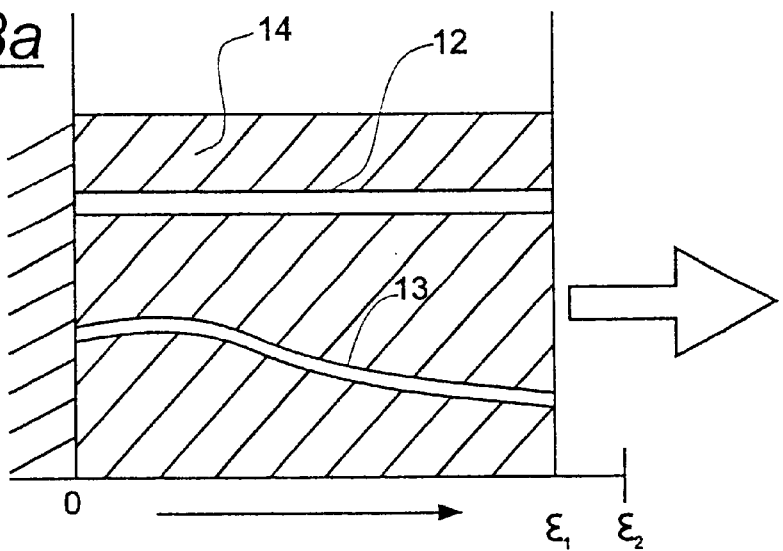
FIGS. 3a and 3b represent fibers embedded in resin at rest and under strain respectively.

From the above, it is understood that a fiber is not properly or effectively utilized if it is not already straight when strain is imposed upon it. For example, with reference to FIGS. 3a and 3b, two fibers 12, 13 are shown embedded in resin 14. FIG. 3a depicts the fibers 12, 13 at rest and FIG. 3b depicts the same fibers 12, 13 subjected to strain.

In FIG. 3a, fiber 12 is shown at rest, but in an ideal taut orientation, ready to accept tension. Fiber 13 is shown in a bent state and unable to immediately accept much tension without first straightening out.

Figure 3B:
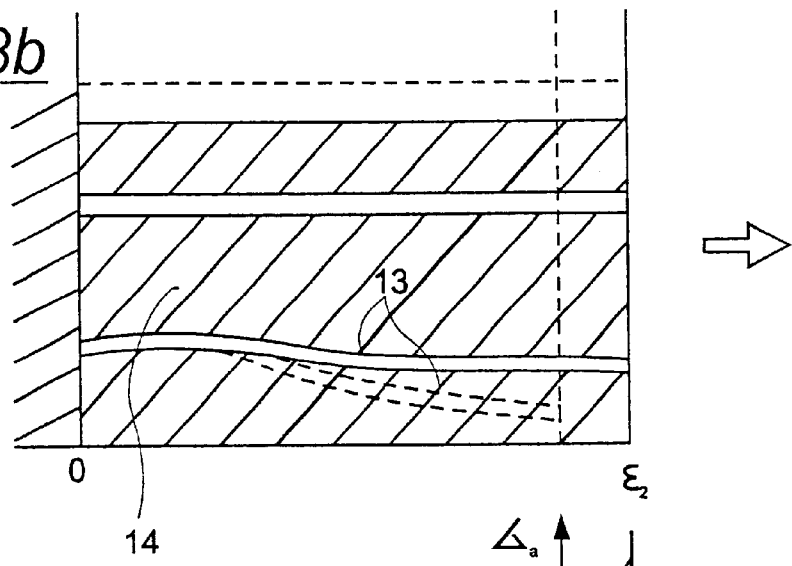

In FIG. 3b, the resin 14 and fiber 12,13 are shown in a displaced state such when an underlying liner is pressurized. The resin 14 and fibers 12,13 have been strained or displaced from $\epsilon_1$ to $\epsilon_2$. Note that fiber 13 has straightened from its original orientation (see dotted lines), but is only just now ready to accept axial tension to any substantial degree.

Figure 3C:
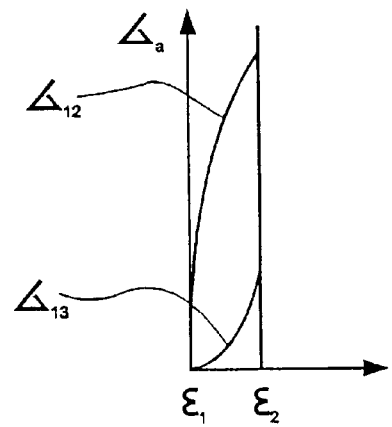
FIG. 3c is a graph depicting the stress versus strain resulting from the load on a straight fiber and a misaligned fiber according to FIGS. 3a and 3b.

As shown in FIG. 3c, the originally taut fiber 12 illustrates the typical stress-strain response $\sigma_{12}$ of a fiber placed under tension. The stress $\sigma_{13}$ on the bent fiber 13 only shows a minor axial stress as it straightens in the resin 14. Clearly, if fiber 12 is not demonstrating stress it cannot be sharing the load imposed upon the composite pressure vessel.

The burst pressure of the fiber-wrapped liner is dependent upon the number of the multiplicity of discrete fibers in the resin that are capable of accepting tensile or axial load.

Figure 4:
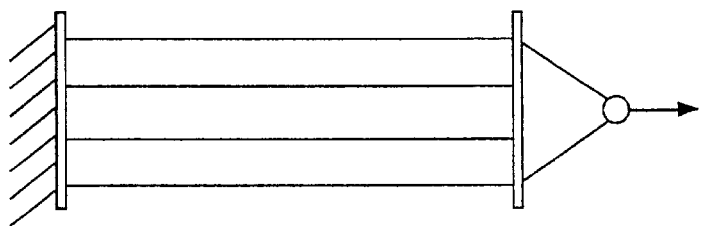
FIG. 4 is a fanciful representation or model of a fiber overwrap in which all fibers participate and achieve a theoretical ultimate tensile strength.
Figure 5A:
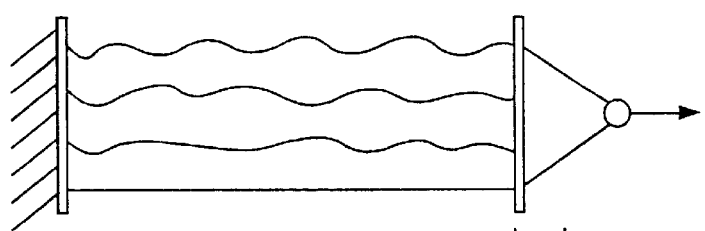
FIGS. 5a, 5b, 5c are fanciful representations of a fiber overwrap having inequities between fibers, demonstrating increased participate at increased displacement.
Figure 5B:
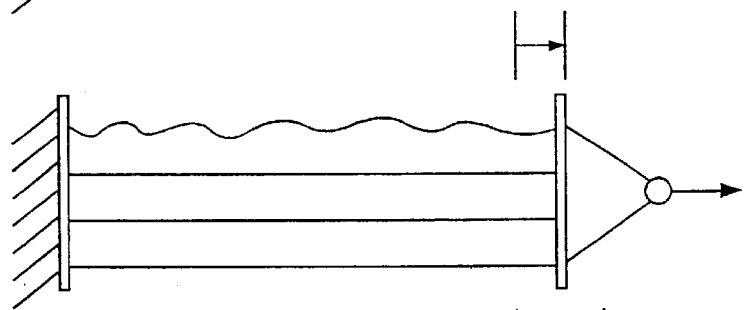
Figure 5C:
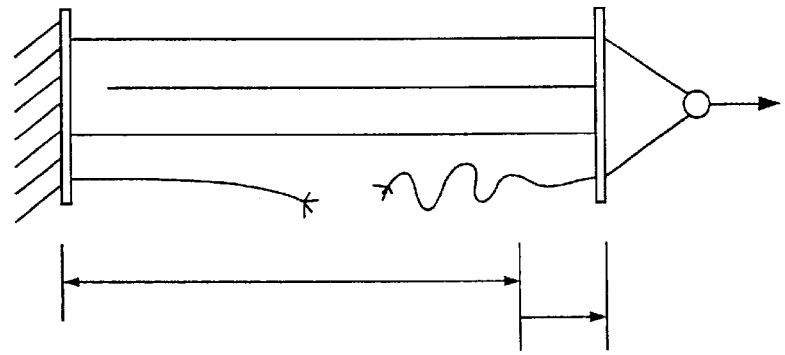

The problem is best illustrated in FIG. 4 and FIGS. 5a–5c. FIG. 4 is a diagrammatic illustration of the ideal case of four fibers which are all aligned and equally capable of accepting tensile load. FIGS. 5a–5c illustrate an extreme case in which only one of four fibers of a fiber wrap are ready to immediately accept loading, the other three being lax or misaligned for some reason. More specifically, having reference back to FIG. 4, the ultimate tensile strength is theoretically achieved when all the fibers are straight and equally capable of carrying a tensile load.

In the cases shown in FIGS. 5a–5c, the incrementally increased tension in fibers, due to displacement under load, will eventually include participation of the misaligned fibers but possibly not in time to aid in contributing to the strength of the vessel.

More particularly, in FIG. 5a, three-quarters of the fibers are illustrated as not participating. In FIG. 5b, the matrix of resin and fibers is stretched sufficiently so that only one fiber is not participating. Note that in this extreme case, all the while as the displacement increases, the first taut fiber is sustaining all the stress. In FIG. 5c, finally all the misaligned fibers are participating, but the initially taut fiber has its exceeded its ultimate tensile strength and snapped. Clearly, the product wrapped as shown in FIGS. 5a–5c are not as strong as a product wrapped as shown in FIG. 4.

Figure 6A:
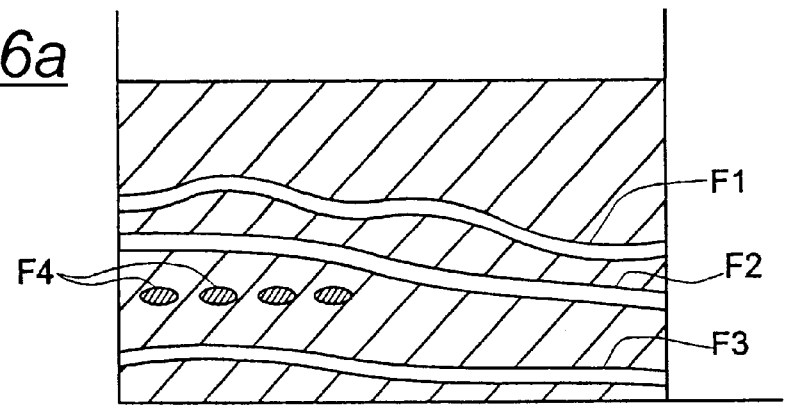
FIGS. 6a, 6b, 6c illustrate the response of fibers to the homogenization process of this invention, namely conventional, during at the conclusion of a homogenizing process, and post-process.

Turning to FIG. 6a, fibers embedded in a modeled block of resin are not all straight and thus must straighten or be straightened before they are capable of carrying a tensile load. The result is a decreased burst strength of the fiber-wrapped liner. Three longitudinally extending fibers F1, F2, F3 are shown underlying and overlying transverse extending fibers F4. Fibers F2 and F3 are characteristically displaced around fibers F4, introducing a slight bend in the fibers. Fiber F1 illustrates the possibility that a lax fiber will have a wave in it.

Figure 6B:
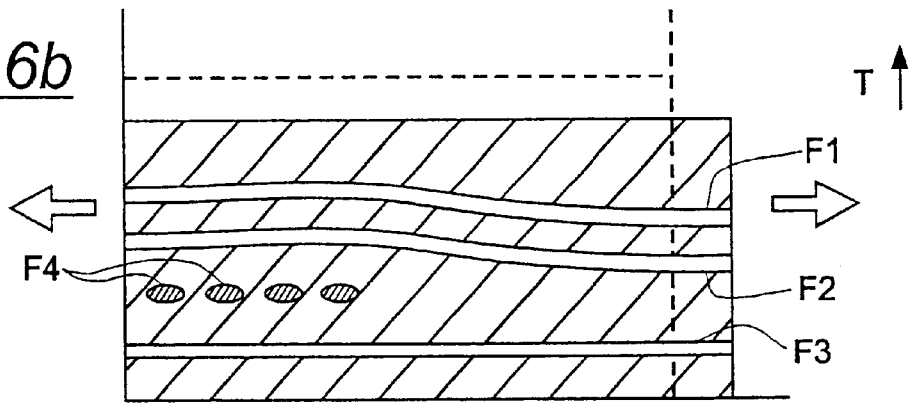

With reference to FIG. 6b, the modeled block of resin has had its temperature elevated and its fibers F1, F2 and F3 subjected to tension. As a result, the fibers straighten and are caused to move through the mobile resin, displacing the resin and thus changing their relative positions therein.

Figure 6C:
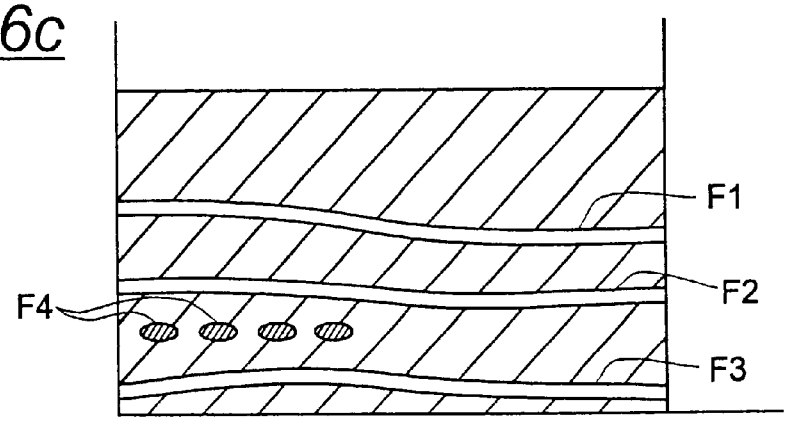

As a result, as shown in FIG. 6c, when the tension is released, the fibers retain a more linear or straight orientation within the cooled resin. Accordingly fibers F1, F2, and F3 are ready to accept tension far earlier than they were as depicted in FIG. 6a.

Figure 7:
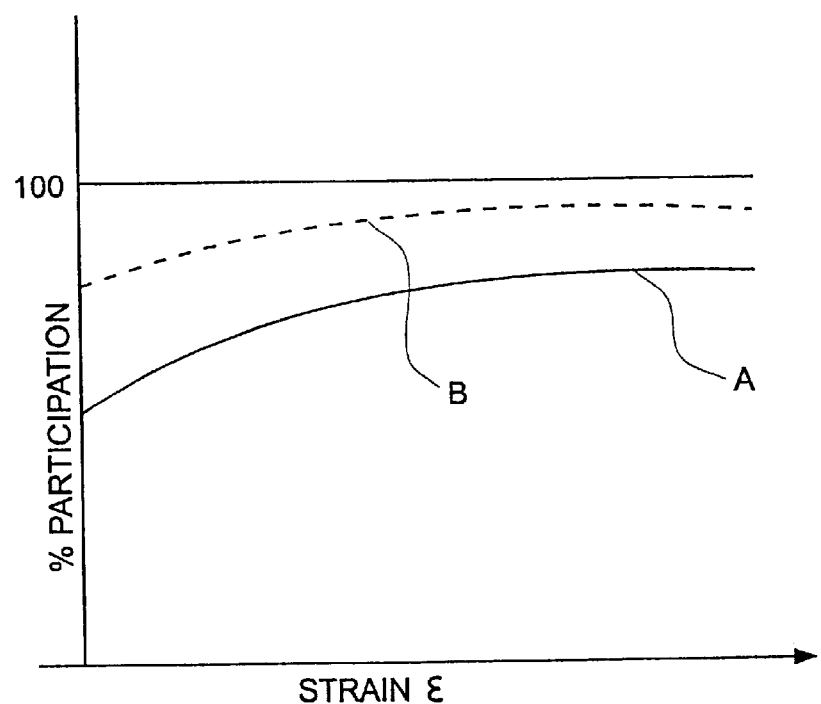
FIG. 7 graphically illustrates the relative improvement in fiber participation between a prior art composite under stress and the process of this invention.

With reference to FIG. 7, the phenomenon of inequitable load sharing is depicted fancifully in a graph as Percent Participation versus Strain ($\epsilon$). As fibers become more and more strained (stretched) under increased load, more and more fibers become taut and begin to participate. A representation of the participation of the fibers of the Prior Art is shown as line A. Many fibers participate during initial strain, however greater numbers participate as the strain increases. Note that line A will never reach 100 percent participation. Not all of the fibers will contribute and those which took the load earliest could very well reach their ultimate tensile stress and fracture before others reach their full load capacity.

Line B illustrates the participation of the fibers after the homogenizing process. It is not expected that the process will result in absolutely all fibers participating and thus the start point is less than 100 percent, however, more fibers participate earlier and thus a greater portion will participate overall for a given displacement or strain.

The process, as described, produces a fiber-wrapped liner that has superior burst strength heretofore not achieved.

It is clearly understood by those of ordinary skill in the art that the improvements in burst strength are in addition to those obtained from autofrettage and that the homogenizing process would obtain an improvement in strength independent of autofrettage, and that if practiced simultaneously, that the elevated temperature process the homogenizing step complements the autofrettage step of the prior art.

EXAMPLE

In an illustration of the first embodiment of the invention, a pressure vessel was manufactured according to one embodiment of the invention. The pressure vessel was intended for storing pressurized gases such as hydrogen and natural gas. Such gases are compressed to a fraction of their uncompressed volume and stored in vessels manufactured of composites to minimize vessel mass.

Further, such vessels are subject to physical and legislated restrictions due to their materials of construction and contents. Once such restriction is the application of temperature limitations. Natural Gas has a boiling point of about −162° C. (−259° F.) and thus is a gas at room temperature. In the case where natural gas is stored as onboard fuel for automotive vehicles, the Canadian Standards Association, for example, CSA B51-97, Part 2, Clause 4.4.2 specifies that the minimum design temperatures may vary from a low of −42° C. (−40° F.) to a high of 82° C. (180° F.). Temperatures of over 57° C. (135° F.) must be sufficiently local, or of short enough duration, that the temperature of gas in the cylinder never exceeds 57° C. (135° F.). Currently, the same criteria is being applied for the storage of Hydrogen gas (Boiling point being −252.87° C. (−423.17° F.). Practically then, temperatures are restricted to a maximum operating temperature of 57° C.

Accordingly, an extruded aluminum liner was wrapped in carbon fibers pre-impregnated with epoxy resin and allowed to air dry, followed by curing at 125 degrees Celsius for two hours. The fibers were carbon or graphite fibers available from Mitsubishi Rayon JP as Grafil 34-700. The epoxy resin was obtained from Shell, as Epon 826/Epi CURE 9551.

Having reference to FIG. 8a, autofrettage A was performed at approximately 6000 psi, suitable to yield the aluminum liner. Conventionally the fiber-wrapped liner is thereafter subjected to a certification testing program. The Canadian Standards Association requires such vessels to be subjected to 11250 cycles at 1.25 times design pressure. For a design pressure of 3000 psi, the fiber-wrapped liners were tested at 4500 psi.

Having reference to FIG. 8b, the homogenization process H was performed following the autofrettage process A. As a result of limitations associated with the testing equipment, the temperatures of the pressure vessel was elevated to 70 degrees Celsius (higher that the maximum operating temperature) and to pressures of 3000 psi. Elevated Temperature and pressure were maintained for approximately 1000 hours before cooling back to operating temperatures. As a result of the above homogenization process, the burst strength was increased about 10–15%.

It is known that, the specifics of which are subject to ongoing testing programs, as the temperature is increased towards the maximum allowable homogenization temperature (150 degrees Celsius for epoxy resin) the resin will become more and more mobile, and it is anticipated that the corresponding time required at which to maintain temperature and tension in the fibers will be decreased.

The temperature and pressure are returned to ambient conditions before starting the pressure testing cycles.

As a result of practicing the process of the invention, the following advantages and product are achieved:

a 10–15% increase in the burst strength of fiber-wrapped vessels subjected and produced using this process;

a decrease in the amount of material required to wrap the liner and consequently a decrease in production costs. As fibers comprise 40% of the overall material and production costs, a 12% saving of fiber can reduce costs by 5–6% with the additional savings realized by the decrease in time required to wrap the liners; and a decrease in the amount of liner material required, which in turn results in less expense and decreased weight required to maintain an equal strength.

In another embodiment of the invention, where the structure or liner materials are other than extruded aluminum, the homogenization process of this invention may be carried out, provided alterations in temperature and pressure are made, dependant upon the type of liner material and the type of resin material used.

If the liner material of a pressure vessel is not capable of withstanding the elevated pressures associated with autofrettage, the autofrettage process is not practiced.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above, and of corresponding Canadian application No. 2,269,976, filed Apr. 23, 1999, and U.S. application Ser. No. 09/556,976, filed Apr. 24, 2000, are hereby incorporated by reference.

What is claimed is:

1. A homogenizing process for treating a structural composite having a shape wrapped with a multitude of fibers, the fibers being embedded in resin, the resin having been cured and having an operating temperature, the fibers being placed under tension when the composite is stressed, comprising:

(a) elevating the temperature of the cured resin above the operating temperature to enable the fibers to be more mobile therein;

(b) placing the fibers under tension;

(c) maintaining the elevated temperature and fiber tension so as to permit the tensioned fibers to move sufficiently within the resin so as to permit disparate tension between individual fibers to homogenize; and (d) lowering the temperature of the resin to within the resin's operating temperature and reducing the tension of the fibers.

2. The homogenizing process as recited in claim 1 wherein the elevated temperature is maintained within a range of temperature, high enough to enable the multitude of fibers to become mobile, but below a temperature at which either the resin or an underlying shape degrades.

3. The homogenizing process as recited in claim 2 wherein the resin is epoxy and the elevated temperature is maintained below 150 degrees Celsius.

4. The homogenizing process as recited in claim 2 wherein the structural composite is a pressure vessel having fibers wrapped over a liner shape, the tension in the fibers being imparted into the fibers by pressurizing the liner from within.

5. The homogenizing process as recited in claim 4 wherein the pressure vessel is also subjected to autofrettage.

6. The homogenizing process as recited in claim 4 wherein the pressure within the liner is sufficient to yield the liner and thus achieve autofrettage.

7. The homogenizing process as recited in claim 4, wherein the liner and the fiber wrap exhibit a burst pressure and the pressure within the liner is maintained below the burst pressure of the liner and its fiber wrap.

8. The homogenizing process as recited in claim 4 wherein the resin is epoxy and the elevated temperature is maintained between 60 and 150 degrees Celsius.

9. The homogenizing process as described in claim 8 wherein the fibers are carbon fibers.

10. The homogenizing process as recited in claim 3 wherein the elevated temperature is maintained between 60 and 150 degrees Celsius.

11. The homogenizing process as recited in claim 10 wherein the fibers are glass fibers.

12. The homogenizing process as described in claim 10 wherein the fibers are carbon fibers.

13. The homogenizing process as described in claim 10 wherein the fibers are aramid fibers.

14. A method for storing fuel gases comprising the steps of:
   (a) providing a composite pressure vessel constrained to operation at or below a maximum operating temperature, the vessel having a liner wrapped with a multitude of fibers, the fibers being embedded in resin, the resin having been cured, the fibers being placed under tension when the composite is stressed;
   (b) homogenizing the vessel by,
      i) elevating the temperature of the cured resin above the maximum operating temperature to enable the fibers to be more mobile therein;
      ii) placing the fibers under tension;
      iii) maintaining the elevated temperature and fiber tension so as to permit the tensioned fibers to move sufficiently within the resin so as to permit disparate tension between individual fibers to homogenize;
      iv) lowering the temperature of the resin to a temperature at or below the maximum operating temperature and reducing the tension of the fibers; and
   (c) storing fuel gases in the composite pressure vessel.

15. The method of storing gases as recited in claim 14, wherein the resin is epoxy and the elevated temperature in step (iii) is maintained between about 60 and 150 degrees Celsius.

16. The method of storing gases as recited in claim 14 wherein the pressure within the liner is maintained below a burst pressure of the liner and its fiber wrap.

17. The method of storing gases as recited in claim 14 wherein the tension is imparted into the fibers by pressurizing the liner.

18. The method of storing gases as recited in claim 17 wherein the pressure within the liner is sufficient to yield the liner and thus achieve autofrettage.

19. A process for manufacturing a pressure vessel comprising providing a vessel (1) wrapped with a multitude of fibres (3), the fibres (3) being embedded in resin; elevating the temperature of the resin to enable the fibres (3) to be more mobile therein; and pressurizing the vessel (1) so as to impact tension into the fibres (3);
   characterized by:
      providing a liner (2) for the vessel (1) which is formed of ductile metal and which is wrapped with the fibres (3);
      pressurizing the liner (2) beyond yield so that when the pressure is reduced, the liner (2) remains compressively prestressed by the fibres (3) and the fibres (3) are tensioned;
      the elevated temperature and the tension in the fibres (3) are maintained sufficiently long so as to permit disparate tension between individual fibres (3) to homogenize, resulting in an overall lower stress in the tensioned fibres (3); and
      the pressure in the vessel (1) and the temperature of the resin are reduced.

20. The process as recited in claim 19, wherein the elevated temperature is maintained within a range of temperature, sufficiently high enough to enable the fibres (3) to move to homogenize tension therebetween, but below a temperature at which the resin or ductile metal liner (2) degrades.

21. The process as recited in claim 20, wherein the ductile metal liner of the pressure vessel (2) is subjected to autofrettage (10) prior to elevating the temperature and pressure.

22. The process as recited in claim 20, wherein the pressure within the liner (2) is sufficient to yield the liner (2) and thus achieve autofrettage (10) during the process.

* * * * *

UNITED STATES PATENT AND TRADEMARK OFFICE
CERTIFICATE OF CORRECTION

PATENT NO.       : 6,425,172 B1                                                  Page 1 of 1
APPLICATION NO.  : 09/628025
DATED            : July 30, 2002
INVENTOR(S)      : Rene Rutz It is certified that error appears in the above-identified patent and that said Letters Patent is hereby corrected as shown below:

Column 10, line 19, reads "impact tension" should read -- impart tension --

Signed and Sealed this

Twenty-ninth Day of August, 2006

JON W. DUDAS
*Director of the United States Patent and Trademark Office*